(12) United States Patent
Kwak et al.

(10) Patent No.: US 8,523,235 B2
(45) Date of Patent: Sep. 3, 2013

(54) CASH AND CHEQUE AUTOMATIC DEPOSITING APPARATUS

(75) Inventors: Jae Hoon Kwak, Gyeonggi-do (KR); Woo Ho Lee, Seoul (KR)

(73) Assignee: Nautilus Hyosung Inc., Seoul (KR)

( * ) Notice: Subject to any disclaimer, the term of this patent is extended or adjusted under 35 U.S.C. 154(b) by 813 days.

(21) Appl. No.: 11/588,357

(22) Filed: Oct. 27, 2006

(65) Prior Publication Data

US 2007/0181668 A1 Aug. 9, 2007

(30) Foreign Application Priority Data

Feb. 3, 2006 (KR) .................. 10-2006-0010482

(51) Int. Cl.
*G07F 7/04* (2006.01)
*G07F 7/00* (2006.01)
*G07D 7/00* (2006.01)
*B42D 15/00* (2006.01)
*B42D 15/10* (2006.01)

(52) U.S. Cl.
USPC ............. 283/70; 194/206; 194/212; 194/302; 283/57; 283/58; 283/72; 283/82; 283/901

(58) Field of Classification Search
USPC .................. 194/205, 206, 207, 209, 212, 213, 194/210, 215, 302, 320, 353; 202/108, 123; 209/534, 555, 556, 567, 571; 221/9, 12, 221/13, 21, 102; 235/379; 250/555, 556; 271/35, 213, 245, 246; 324/202; 356/71, 356/394, 430, 431, 432, 433, 435; 714/25, 714/30; 902/7; 283/57, 58, 67, 70, 72, 82, 283/117, 901
IPC .................. B07C 3/00, 3/20; G07D 7/00, 7/04, G07D 7/12, 7/16, 7/20, 11/00; G07F 19/00
See application file for complete search history.

(56) References Cited

U.S. PATENT DOCUMENTS

| | | | | |
|---|---|---|---|---|
| 5,198,975 | A * | 3/1993 | Baker et al. | 283/58 |
| 5,555,983 | A * | 9/1996 | Yamagishi | 209/534 |
| 6,573,983 | B1 * | 6/2003 | Laskowski | 356/71 |
| 6,896,117 | B2 * | 5/2005 | Nomura | 194/213 |
| 2001/0054643 | A1 * | 12/2001 | Siemens | 235/379 |
| 2004/0182678 | A1 * | 9/2004 | Ina et al. | 194/207 |
| 2006/0163027 | A1 * | 7/2006 | Hobmeier et al. | 194/207 |
| 2006/0202014 | A1 * | 9/2006 | VanKirk et al. | 235/379 |

* cited by examiner

*Primary Examiner* — Dana Ross
*Assistant Examiner* — Justin V Lewis
(74) *Attorney, Agent, or Firm* — Fenwick & West LLP

(57) ABSTRACT

A cash and check automatic depositing apparatus is capable of automatically depositing a bundle of cashes and checks inserted at once. The apparatus includes a bundle insertion opening for allowing a user to deposit or receive therethrough a bundle of cashes and checks, and a bundle separator for separating the banknotes inserted through the bundle insertion opening one by one. The separated banknotes are automatically transferred one by one and verified to check authenticity or abnormality thereof. Further, the banknotes are transferred onto an authentic check transfer path and an authentic cash transfer path to be separately stored in storage cassettes.

9 Claims, 2 Drawing Sheets

CASH AND CHEQUE AUTOMATIC DEPOSITING APPARATUS

FIELD OF THE INVENTION

The present invention relates to a cash and cheque automatic depositing apparatus as an ATM (Automated Teller Machine) capable of performing banking transactions, and, more particularly, to a cash and cheque automatic depositing apparatus capable of automatically depositing a bundle of cashes and cheques inserted at once.

BACKGROUND OF THE INVENTION

In general, various ATMs (automated teller machines) have been prevailed in banking agencies such as banks and the like. The ATM saves a user's waiting time and enables a user to conduct banking transactions at any time without resort to the intervention of a clerk.

As an example of the ATM, U.S. patent application Ser. No. 11/475,138 entitled "AUTOMATED TELLER MACHINE CAPABLE OF DEPOSITING CHEQUES" has been filed on Jun. 27, 2006, by the Applicant of the present invention, which is commonly assigned to the Applicant of the present invention.

Such a ATM for cheque depositing can improve the efficiency of banking business by way of automatically depositing cheques. However, the ATM causes inconvenience for a user to deposit cheques into the ATM one by one, which excessively increases a processing time.

SUMMARY OF THE INVENTION

It is, therefore, an object of the present invention to provide a cash and cheque depositing apparatus capable of depositing a bundle of cashes and cheques inserted at once.

In accordance with the present invention, there is provided a cash and cheque automatic depositing apparatus for automatically depositing a bundle of banknotes such as cashes and cheques, the apparatus comprising: a bundle insertion opening for allowing a user to deposit or receive therethrough the bundle of banknotes; a bundle separator for separating the banknotes inserted in a bundle one by one; a main transfer unit for horizontally transferring the banknotes one by one along a main transfer path; a banknote verifying unit installed on the main transfer path, for verifying authenticity or abnormality of each of the banknotes by acquiring features information on each of the banknotes; an abnormal banknote branch transfer unit having an abnormal banknote branch transfer path branched from the main transfer path, for transferring abnormal banknotes verified by the banknote verifying unit; a first gate for selectively switching between the abnormal banknote branch transfer path and the main transfer path; an abnormal banknote unloading transfer unit having an abnormal banknote unloading transfer path for discharging the abnormal banknotes to the bundle insertion opening; an authentic cheque transfer unit having an authentic cheque transfer path for transferring authentic cheques verified by the banknote verifying unit and an authentic cash transfer unit having an authentic cash transfer path for transferring authentic cashes verified by the banknote verifying unit, the authentic cheque and the authentic cash transfer paths being branched from a rear end side of the main transfer path; a second gate for selectively switching between the authentic cheque transfer path and the authentic cash transfer path; an authentic cheque storage cassette for storing therein the authentic cheques transferred on the authentic cheque transfer unit; and an authentic cash storage cassette for storing therein the authentic cashes transferred on the authentic cash transfer unit.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Hereinafter, preferred embodiments of the present invention will be described in detail with reference to the accompanying drawings.

Figure 1:
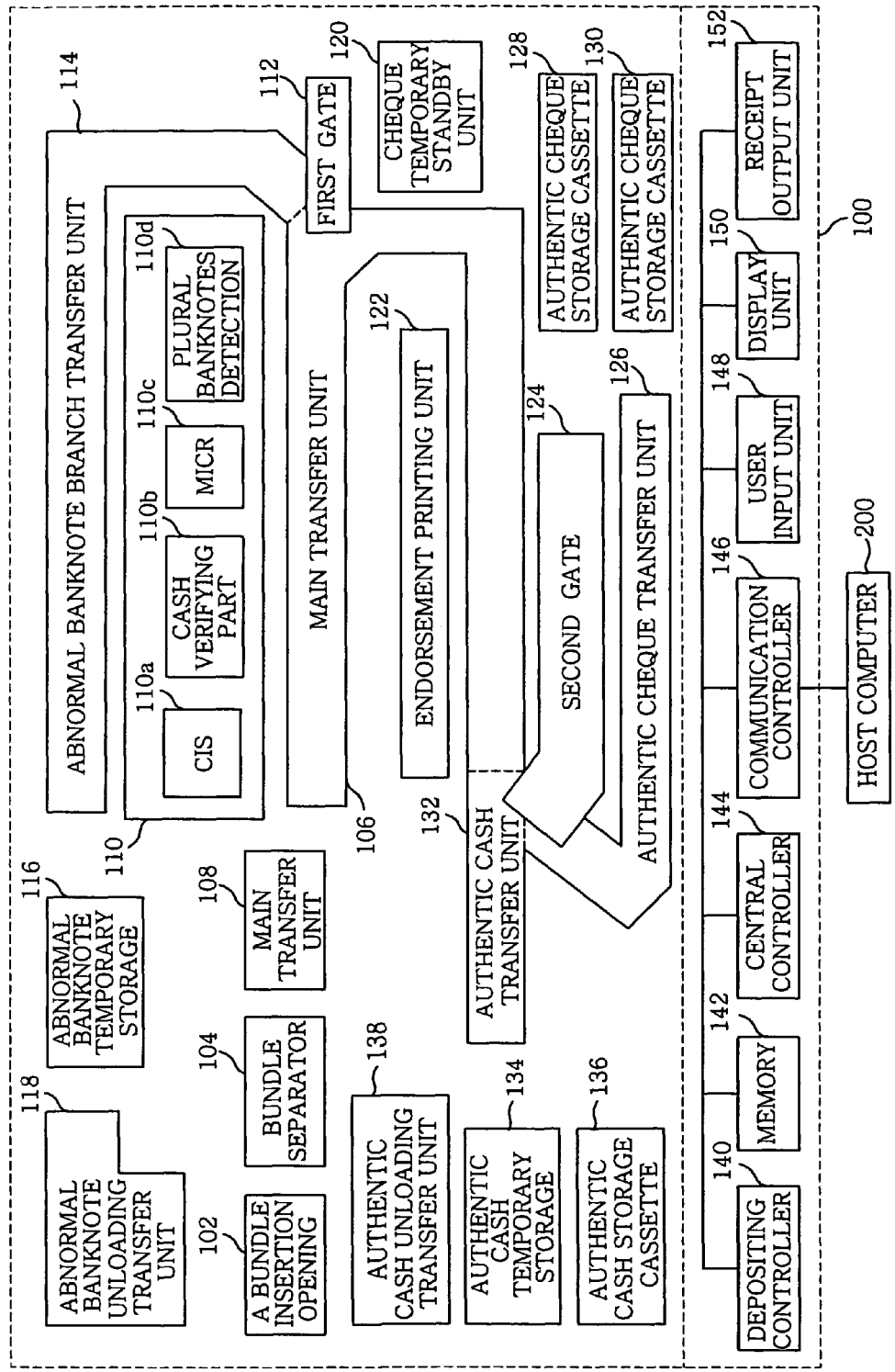
FIG. 1 is a block diagram illustrating a cash and cheque automatic depositing apparatus in accordance with the present invention.
Figure 2:
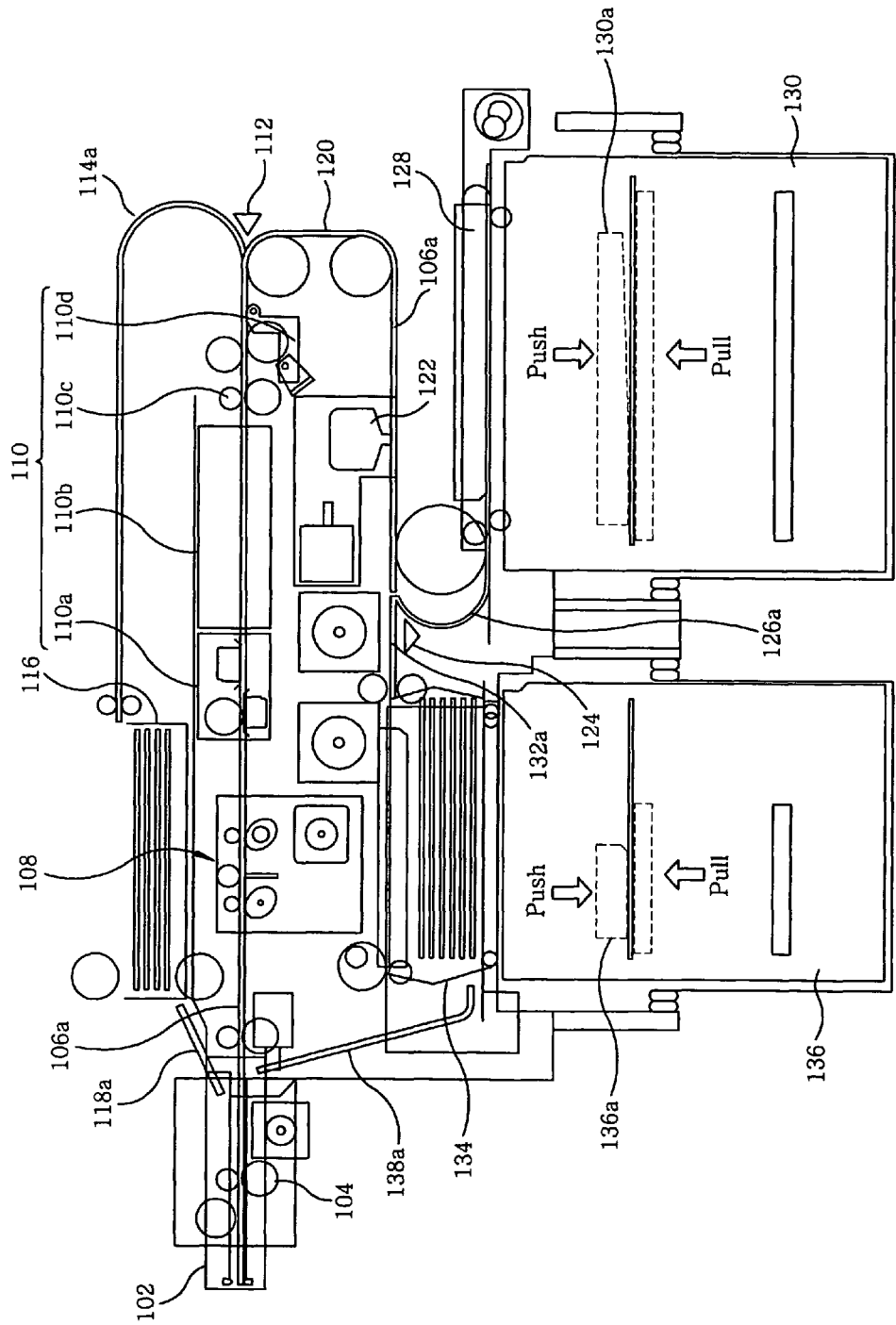
FIG. 2 shows a schematic diagram depicting the cash and cheque automatic depositing apparatus of FIG. 1.

FIG. 1 is a block diagram illustrating a cash and cheque automatic depositing apparatus in accordance with the present invention, and FIG. 2 shows a schematic diagram depicting the cash and cheque automatic depositing apparatus of FIG. 1.

A cash and cheque automatic depositing apparatus 100 in accordance with the present invention includes: a bundle insertion opening 102 for allowing a user to deposit or receive therethrough a bundle of banknotes such as cashes and cheques; a bundle separator 104 for separating the banknotes inserted therein one by one and then automatically conveying the separated banknotes at regular time intervals; a main transfer unit 106 for horizontally transferring the banknotes one by one along a main transfer path 106a; and an auto-alignment unit 108 provided on the main transfer path 106a, for aligning the banknotes to one side while constantly transferring the banknotes.

The cash and cheque automatic depositing apparatus 100 further includes a banknote verifying unit 110 provided on the main transfer path 106a, for verifying authenticity or abnormality of the banknotes by acquiring various information on the banknotes; an abnormal banknote branch transfer unit 114 having an abnormal banknote branch transfer path 114a branched from the main transfer path 106 in a different direction at a rear side of the banknote verifying unit 110, for transferring abnormal banknotes verified by the banknote verifying unit 110; a first gate 112 for selectively switching a transfer path between the abnormal banknote branch transfer path 114a and the main transfer path 106a continued toward a rear side; an abnormal banknote temporary storage 116 installed at a rear end side of the abnormal banknote branch transfer path 114a, for laminating and temporarily storing the consecutively transferred abnormal banknotes; and an abnormal banknote unloading transfer unit 118 having an abnormal banknote unloading transfer path 118a for transferring the abnormal banknotes stored in the abnormal banknote temporary storage 116 to the bundle insertion opening 102 by connecting the abnormal temporary storage 116 and the bundle insertion opening 102.

The cash and cheque automatic depositing apparatus 100 further includes a cheque temporary standby unit 120 formed on the main transfer path 106a provided at a rear side of the first gate 112, for temporarily stopping a transfer of authentic cheques; an endorsement printing unit 122 followed by the cheque temporary standby unit 120 on the main transfer path 106a, for printing endorsement information on the authentic cheques according to printing instructions; an authentic cheque transfer unit 126 having an authentic cheque transfer path 126a for transferring authentic cheques and an authentic cash transfer unit 132 having an authentic cash transfer path 132a for transferring authentic cashes, the transfer units being followed by the endorsement printing unit 122, the transfer paths being branched from a rear end side of the main transfer path 106a; and a second gate 124 for selectively switching a transfer path between the authentic cheque transfer path 126a and the authentic cash transfer path 132a.

The cash and cheque automatic depositing apparatus 100 further includes an authentic cheque incoming unit 128 disposed at a rear end side of the authentic cash transfer path 126a, for temporarily holding the authentic cheques for storage; an authentic cheque storage cassette 130 for receiving and storing the authentic cheques held by the authentic cheque incoming unit 128 for storage with the use of a vertically moving push bar 130a; an authentic cash temporary storage 134 provided at a rear end side of the authentic cash transfer path 132a, for sequentially laminating and temporarily holding the consecutively transferred authentic cashes for storage; an authentic cash storage cassette 136 for receiving and storing the laminated authentic cashes held by the authentic cash temporary storage 134 for storage with the use of a vertically moving push bar 136a; and an authentic cash unloading transfer unit 138 having an authentic cash unloading transfer path 138a for transferring the authentic cashes to the bundle insertion opening 102 according to a user's depositing cancellation input by connecting the authentic cash temporary storage 134 and the bundle insertion opening 102.

Hereinafter, each of the above-described components will be described in detail.

The bundle insertion opening 102 enables a user to deposit or receive a bundle of banknotes such as cashes and cheques. Such a bundle insertion opening 102 may include an insertion case for holding a bundle of banknotes that have been inserted or will be returned, a shutter for opening/closing the insertion case, and the like.

The bundle separator 104 functions to separate the inserted banknotes one by one and then automatically transfers the separated banknotes at regular time intervals.

If the banknotes are cashes, the bundle separator 104 consecutively transfers the cashes at regular time intervals. On the contrary, if the banknotes are cheques, when an internal process for a previously transferred cheque is completed, a next cheque is transferred.

The main transfer unit 106 serves to horizontally transfer the banknotes one by one. The main transfer unit 106 include the main transfer path 106a formed between both guide walls; a plurality of transfer driving units, e.g. transfer rollers, provided along the main transfer path 106a, for transferring the banknotes in direct contact therewith; and a transfer driving force provider, e.g., a driving motor, for providing a driving force to the transfer driving units.

The auto-alignment unit 108 quickly and accurately aligns the banknotes to one side while constantly transferring the banknotes. The reason for aligning the banknotes is to improve processing accuracy by way of allowing the banknote verifying unit 110 to accurately recognize the aligned banknotes and the endorsement printing unit 122 to perform the endorsement printing on an accurate position.

The banknote verifying unit 110 provided on the main transfer path 106a verifies authenticity or abnormality of the transferred banknotes. Such a banknote verifying unit 110 include a CIS (Contact Image Sensor) 110a for acquiring and analyzing image information by scanning both surfaces of the banknotes; a cash verifying part 110b for verifying authenticity or abnormality of cashes by reading out characteristics of the cashes with the use of various detection sensors (not shown); an MICR (Magnetic Ink Character Recognition) 110c for acquiring magnetic ink character information printed on cheques; and a plural banknotes detection part 110d provided on the main transfer unit 106a, for detecting whether or not two or more banknotes are overlapped one above another.

The CIS 110a acquires image information on the banknotes by consecutively scanning both surfaces of the banknotes that have been position-aligned by the auto-alignment unit 108. Such a CIS 110a may include two scanning heads for scanning both surfaces of the banknotes while being contacted therewith; a pressurizing device for adhering the banknotes to the scanning heads for an accurate scanning; and an information reading device for acquiring information such as characters and figures from the image data scanned by the scanning heads.

Therefore, the CIS 110a recognizes a size of the banknotes and also verifies, based on the acquired image data thereof, whether they are damaged or not. If necessary, various information on the external appearance and the amount of banknotes can be acquired by reading out additional information such as various characters and figures from the image data. Based on such acquired information, the authenticity or the abnormality of the banknotes is verified. Further, the banknotes are calculated by considering the size of the banknotes and the number of scanning processes.

The cash verifying unit 110b verifies authenticity or abnormality of cashes by reading out features thereof with the use of various detection sensors (not shown). The features of the cashes detected by the cash verifying unit 100b may include a size, a printing pattern and the like. Further, the detection sensors may include at least one among a light emitting sensor, a magnetic sensor, an UV sensor, an infrared sensor and the like.

In this regards, the light emitting sensor can measure a length and a size of the cashes by irradiating light to the cashes and detecting a phase difference of the light reflected therefrom. The UV sensor and the magnetic sensor detect the authenticity or the abnormality of the cashes by detecting materials responding to ultraviolet rays distributed on authentic cashes in a specific pattern or magnetic components contained in a specific portion in the cashes. Moreover, the infrared sensor detects the authenticity or the abnormality of the cashes by detecting characteristics thereof such as a thickness, a length and a color distribution.

The MICR 100c acquires magnetic character information printed on cheques. Such an MICR 100c includes a magnetic recognition head, a pressurizing device for adhering the cheques to the magnetic recognition head for an accurate recognition and the like.

In other words, the cheques contain issuance information, such as serial numbers, account numbers and the like, at predetermined portions in the form of magnetic characters. The magnetic character information acquired by the magnetic recognition head of the MICR 110c is used for verifying the authenticity or the abnormality of the cheques.

The plural banknotes detection part 110d detects whether or not two or more banknotes are overlapped one above another, because the internal process is not accurately performed when the banknotes are transferred in a state of being overlapped with each other. Preferably, the plural banknotes detection part 110d verifies the presence of plural banknotes by way of detecting a thickness of the banknotes. Further, the CIS 110a and the MICR 110c are also used for verifying whether the banknotes are overlapped or not. Due to such a tripartite detection, it is possible to accurately detect the presence of plural banknotes. A detailed description for the CIS 110a and the MICR 110c is disclosed in the above-described U.S. patent application Ser. No. 11/475,138, which is incorporated herein by reference.

The first gate 112 selectively switches a transfer path between the abnormal banknote branch transfer path 114a for transferring the abnormal banknotes verified by the banknote verifying unit 110 and the main transfer path 106a continued therefrom, the abnormal banknote branch transfer path 114a being branched from the main transfer path 106a at a rear side of the banknote verifying unit 110. Consequently, the banknotes are transferred along the transfer path opened by first gate 12.

The following is a detailed description of an operation of the first gate 112. As soon as the banknotes pass through the banknote verifying unit 110, the authenticity or the abnormality of the banknotes is verified. When they are authentic, the corresponding banknotes are transferred along the main transfer path 106a. On the other hand, when they are abnormal, the corresponding banknotes are transferred along the abnormal banknote branch transfer path 114a.

The abnormal banknote temporary storage 116 is installed at the rear end side of the abnormal banknote branch transfer path 114a and temporarily stores therein the consecutively transferred abnormal banknotes. In other words, until a bundle of the banknotes inserted at once into the bundle insertion opening 102 are completely processed, the abnormal banknotes verified by the banknote verifying unit 110 are temporarily stored in the abnormal banknote temporary storage 116.

The abnormal banknote unloading transfer unit 118 transfers the abnormal banknotes stored in the abnormal banknote temporary storage 116 to the bundle insertion opening 102 by connecting the abnormal temporary storage 116 and the bundle insertion opening 102. The banknotes stored in the abnormal banknote temporary storage 116 can be transferred all at once or one by one by a bundle separator.

On the other hand, the cheque temporary standby unit 120 formed on a specific section of the main transfer path 106a between the first gate 112 and the main transfer path 106a temporarily stops a transfer of authentic cheques verified by the banknote verifying unit 110. Before the cheques are subjected to an endorsement printing indicating that the rights relating to the cheques are transferred from customers to the bank, the cheques are held for the user as an owner to input an instruction. When a depositing instruction is inputted, the cheques are transferred to the endorsement printing unit 122. On the contrary, when a depositing cancellation instruction is inputted, the cheques are transferred to the bundle insertion opening 102 or the abnormal banknote temporary storage 116 by a reverse driving of the main transfer unit 106 so that they can be returned to the user.

The endorsement printing unit 122 performs the endorsement printing only when the banknote verifying unit 110 verifies that the cheques are authentic and, also, when the cheque temporary standby unit 120 receives an owner's final depositing instruction. Herein, the endorsement information includes a deposition date, a deposition amount and bank information. Preferably, the endorsement printing unit 122 executes a dot print operation.

The second gate 124 followed by the endorsement printing unit 122 selectively switches a transfer path between the authentic cheque transfer path 126a for transferring authentic cheques and the authentic cash transfer path 132a for transferring authentic cashes, both being branched from a rear end side of the main transfer path 106a. That is, the transfer paths are selectively opened/closed depending on types of the banknotes such as cashes and cheques.

The authentic cheque incoming unit 128 disposed at a rear end side of the authentic cash transfer path 132 temporarily holds the consecutively transferred authentic cheques for storage.

The authentic cheque storage cassette 130 stores therein the authentic cheques held by the authentic cheque incoming unit 128 for storage with the use of the vertically moving push bar 130a. Herein, an ATM for consecutively storing cheques by using a push bar is disclosed U.S. patent application Ser. No. 11/475,133 filed on Jun. 27, 2006, which is commonly assigned to the Applicant of the present invention and which is incorporated herein by reference.

The authentic cash temporary storage 134 provided at a rear end side of the authentic cash transfer path 132a sequentially laminates and temporarily holds the consecutively transferred authentic cashes for storage.

The authentic cash storage cassette 136 receives and stores therein the laminated authentic cashes held by the authentic cash temporary storage 134 for storage with the use of the vertically moving push bar 136a. Such an authentic cash storage cassette 136 can be implemented as same as the aforementioned authentic cheque storage cassette 130.

The authentic cash unloading transfer unit 138 transfers the authentic cashes temporarily stored in the authentic cash temporary storage 134 to the bundle insertion opening 102 according to a user's depositing cancellation issue by connecting the authentic cash temporary storage 134 and the bundle insertion opening 102. Herein, the authentic cashes stored in the authentic cash temporary storage 134 can be transferred all at once or one by one by a bundle separator.

The cash and cheque automatic depositing apparatus 100 in accordance with the present invention further includes a memory 142 for storing various information acquired by the banknote verifying unit 110; an depositing controller 140 for controlling an entire mechanical operation of the apparatus 100; a communication controller 146 for communicating with an external host computer 200 connected thereto via a network; a central controller 144 for generally controlling the memory 142, the depositing controller 140, the communication controller 146 and the like; a user input unit 148 for allowing a user to input information; a display unit 150 for displaying information to the outside so that user can recognize the information; and a receipt output unit 152 for outputting to the user a deposit result as a receipt.

The memory 142 stores therein various information acquired by the banknote verifying unit 110 and various software executable by the central controller 144.

The depositing controller 140 controls an entire operation of the apparatus under the control of the central controller 144. The operation controlled by the depositing controller 140 includes banknote transfer, alignment, scanning, magnetic character recognition, plural banknotes detection, endorsement printing and storage.

The communication controller 146 is a communication interface for communicating with the host computer 200. Such a communication controller 145 may include a transmitting part for transmitting acquired various information to the host computer 200 and a receiving part for receiving various information from the host computer 200. When the cash and cheque automatic depositing apparatus 100 in accordance with the present invention transmits the acquired information, the host computer 200 can respond thereto by using corresponding information.

The central controller 144 performs a substantial central control by executing the software stored in the memory 142.

The user input 148 allows a user to input information, which may be implemented as a key panel, a touch panel and the like.

The display unit 150 displays information to the outside so that the user can recognize the information.

The receipt output unit 152 outputs to the user a deposit result as a receipt.

Hereinafter, a preferable entire operation of the aforementioned configuration will be described.

First of all, the user is asked to select a type of banknotes to be deposited between cash and cheque on the display 150 by using the user input unit 148.

When the shutter of the bundle insertion opening 102 is opened, the user inserts a bundle of banknotes, e.g., cashes or cheques to be deposited at once.

Next, the shutter of the bundle insertion opening 102 is closed. Thereafter, the bundle separator 104 provided at the bundle insertion opening 102 side operates and, simultaneously, the main transfer unit 106 is started to be driven. Accordingly, the bundle separator 104 separates the banknotes one by one and consecutively transfers at regular time intervals the separated banknotes along the main transfer path 106a.

Then, the banknotes are aligned to one side by the auto-alignment unit 108 and then transferred to the banknote verifying unit 110.

That is, the banknotes sequentially pass through the CIS 110a, the cash verifying part 110b, the MICR 110c and the plural banknotes detection part 110d of the banknote verifying unit 110. In this case, when the banknotes are cashes, the CIS 110a acquires and reads image information thereof. Further, the cash verifying part 110b reads out characteristics thereof by using various detection sensors, and the plural banknotes detection part 110d detects whether the cashes are overlapped or not. Accordingly, the authenticity or the abnormality of the cashes is verified.

On the other hand, when the banknotes are cheques, the CIS 110a acquires and read image information thereof. Moreover, the MICR 110c acquires magnetic character information printed on the cheques, and the plural banknotes detection part 110d detects whether the cheques are overlapped or not. By exchanging such acquired information with the host computer 200, the authenticity or the abnormality of the cheques is verified.

As soon as the banknotes pass through the banknote verifying unit 110, the authenticity or the abnormality of the banknotes is verified. Then, the first gate 112 provided at the rear side of the banknote verifying unit 110 selectively opens the transfer paths depending on the verification result, to thereby transfer the banknotes along the selected transfer path.

If the banknote verifying unit 110 verifies that the banknotes are authentic, the first gate 112 opens the main transfer path 106a and, thus, the banknotes are consecutively transferred along the main transfer path 106a. Otherwise, the first gate 112 opens the abnormal banknote branch transfer path 114a, so that the banknotes are consecutively transferred along the abnormal banknote branch transfer path 114a.

The banknotes transferred along the abnormal banknote branch transfer path 114a are finally stored in the abnormal banknote temporary storage 116 provided at the rear end side of the abnormal banknote branch transfer path 114a.

On the other hand, the banknotes transferred along the main transfer path 106a are differently processed depending on their types. If they are cheques, they are temporarily held by the cheque temporary standby unit 120 formed on a specific section of the main transfer path 106a. While they are being held, the display 150 displays thereon that the cheques are authentic and, also, the user is asked to select a depositing consent or a depositing cancellation by using the user input unit 148. When the depositing cancellation instruction is inputted, the main transfer unit 106 is driven in a reverse direction, thereby transferring the cheques to the bundle insertion opening 102 or the abnormal banknote temporary storage 116 in a reverse direction. In this manner, the depositing process is completed, and the cheques are returned to the user. On the contrary, the depositing consent instruction is issued, the main transfer unit 106 is driven in a positive direction, thereby transferring the cheques forward. Next, the endorsement printing unit 122 performs an endorsement printing on the cheques. After the printing is completed, the cheques are transferred along the authentic cheque transfer path 126a selectively opened by the selective opening of the second gate 124 and then held by the authentic cheque incoming unit 128. Thereafter, the authentic cheques are consecutively deposited in the authentic cheque storage cassette 130 by lowering and pushing the push bar 130a of the authentic cheque storage cassette 130.

After a single cheque is deposited, a next cheque undergoes a depositing process as described above. Accordingly, all of the authentic cheques are stored in the authentic cheque storage cassette 130. On the contrary, the abnormal cheques are stored in the abnormal banknote temporary storage 116 and then transferred to the bundle insertion opening 102 by the abnormal banknote unloading transfer unit 118 so that the user can receive the cheques.

Herein, as soon as the cheques are consecutively held by the authentic cheque incoming unit 128, the push bar 130a is lowered to store the authentic cheques in the authentic cheque storage cassette 130. Alternatively, there may be provided another example in which authentic cheques are collected in the authentic cheque incoming unit 128 until a bundle of cheques inserted into the bundle insertion opening 102 are all processed. In such an example, the authentic cheques are stored all at once in the authentic cheque storage cassette 130 by lowering the push bar 130a.

Meanwhile, when the authentic banknotes verified by the banknote verifying unit 110 are cashes, they are transferred along the main transfer unit 106a and then along the authentic cash transfer path 132a branched therefrom. Next, the corresponding cashes are temporarily stored in the authentic cash temporary storage 134 provided at the rear end side of the authentic cash transfer path 132a. In other words, by repetitively and sequentially processing the cashes transferred from the bundle separator 104 at regular time intervals, the authentic cashes are laminated in the authentic cash temporary storage 134. On the other hand, the abnormal cashes are temporarily stored in the authentic banknote temporary storage 116 and then transferred to the bundle insertion opening 102 by the abnormal banknote unloading transfer unit 118 so that the user can receive them.

Before the authentic cashes laminated in the authentic cash temporary storage 134 are stored in the authentic cash storage cassette 136, the display 150 displays to the user that the specific number of authentic cash leaves are waiting for final storage and, also, the user is asked to select a depositing consent or a depositing cancellation by using the user input unit 148. When the depositing cancellation instruction is inputted, the cashes stored in the authentic cash temporary storage 134 are transferred to the bundle insertion opening 102 by the authentic cash unloading transfer unit 138 so that the user can receive them. On the contrary, when the depositing consent instruction is inputted, the push bar 136a of the authentic cash storage cassette 136 is lowered, thereby depositing the authentic cashes stored in the authentic cash temporary storage 134 in the authentic cash storage cassette 136.

By repeating the aforementioned depositing process, the large amount of cheques and cashes are stored in the authentic cheque storage cassette 130 and the authentic cash storage cassette 136, respectively. Thus, after a specific period of time, a bank clerk needs to take out the laminated cheques and cashes from the storage cassettes 130 and 136.

In the above-described example, it has been disclosed that the banknotes are deposited after their types are checked. Alternatively, the apparatus 100 itself can automatically check types of the banknotes in real-time and perform the processing according to the check result. To be specific, when the detection sensors of the cash verifying part 110b in the banknote verifying unit 110 detect errors and, also, when the banknotes are normally read by the MICR 110c, they are determined to be cheques. On the contrary, when the banknotes are normally recognized by the detection sensors of the cash verifying part 110b but are abnormally read by the MICR 110c, they are determined to be cashes. Accordingly, the second gate 124 is switched in real-time, thereby transferring authentic cheques to the authentic cheque incoming unit 128 and authentic cashes to the authentic cash temporary storage 134. Meanwhile, abnormal cheques and abnormal cashes are transferred to the abnormal banknote temporary storage 116.

Such a configuration enables the user to insert mixed banknotes without dividing them into cash or cheque. That is, a user may insert a bundle of cash, a bundle of cheques or a mixed bundle of cash and cheques into cash and cheque automatic depositing apparatus 100 of the present invention.

Furthermore, it has been disclosed that the banknote verifying unit 110 verifies the types of banknotes by using the CIS 110a, the cash verifying part 110b and the MICR 110c. Among them, the CIS 110a and the cash verifying part 110b are used for verifying cashes, whereas the CIS 110a and the MICR 110c are used for verifying cheques. If the cash verifying part 110b is provided with an additional CIS (not shown), the cash verifying part 110b is exclusively driven for cashes, whereas the CIS 110a and the MICR 110c are exclusively driven exclusively for cheques. In other words, the banknote verifying unit 110 may be variously implemented.

As described, the present invention is efficient for general usage due to its capability of depositing cashes and cheques. Moreover, since a bundle of cashes and cheques can be deposited, the user does not need to insert them one by one, which greatly improves the user's convenience. Further, a rapid processing enhances the productivity.

While the invention has been shown and described with respect to the preferred embodiment, it will be understood by those skilled in the art that various changes and modification may be made without departing from the spirit and scope of the invention as defined in the following claims.

What is claimed is:

1. A cash and cheque automatic depositing apparatus for automatically depositing a bundle of banknotes including at least one cheque, the apparatus comprising:
    a bundle insertion unit configured to receive the bundle of banknotes from a user;
    a bundle separator coupled to the bundle insertion unit and configured to separate the bundle of banknotes received at the bundle insertion unit into individual sheets and transfer each of the individual sheets with a predetermined time interval;
    a main transfer unit coupled to the bundle separator and configured to horizontally transfer the individual sheets of the banknotes along a main transfer path;
    a verifying unit installed on the main transfer path and configured to verify authenticity or abnormality of each of the banknotes by acquiring features information on each of the banknotes, the verifying unit configured to produce a verification result indicating the authenticity or abnormality of each of the banknotes, the verification unit further configured to perform tripartite detection of overlapping of the individual sheets in the main transfer unit using three different sensors;
    an abnormal sheet branch transfer unit having an abnormal sheet branch transfer path branched from the main transfer path, the abnormal sheet branch transfer unit configured to transfer abnormal banknotes verified by the verifying unit;
    a first gate configured to selectively route the verified banknotes to the abnormal sheet branch transfer path or the main transfer path;
    an abnormal sheet unloading transfer unit coupled to the first gate, the abnormal sheet unloading unit having an abnormal sheet unloading transfer path and configured to return the abnormal banknotes to the user;
    an authentic cheque transfer unit coupled to an end of the main transfer path, the authentic sheet transfer unit having an authentic cheque transfer path and configured to transfer at least one authentic cheque in the bundle of banknotes verified by the verifying unit;
    an authentic cash transfer unit coupled to the end of the main transfer path, the authentic cash transfer unit having an authentic cash transfer path and configured to transfer authentic banknotes other than cheques verified by the verifying unit;
    a second gate configured to route the at least one cheque transferred by the main transfer unit to the authentic cheque transfer path and configured to route the banknotes transferred by the main transfer unit to the authentic cash transfer path;
    an authentic cheque storage cassette coupled to the authentic cheque transfer unit, the authentic cheque storage cassette configured to store therein the at least one authentic cheque transferred by the authentic cheque transfer unit;
    an authentic cash storage cassette coupled to the authentic cash transfer unit and configured to store therein the authentic banknotes other than cheques transferred by the authentic cash transfer unit;
    a cheque standby unit placed in the main transfer path between the first gate and the second gate, the cheque standby unit configured to hold the at least one authentic cheque to return the at least one authentic cheque to the user responsive to receiving user instructions cancelling depositing of the at least one authentic cheque; and
    a depositing controller connected to the first gate, the second gate and the verifying unit, the depositing controller configured to transfer the authentic banknotes to the main transfer path but transfer abnormal banknotes to the abnormal sheet branch transfer path based on the verification result, and transfer each of the individual sheets in the banknotes determined to be a cheque to the authentic cheque transfer path and the banknotes other than the cheque to the authentic cash transfer path based on the verification result.

2. The apparatus of claim 1, further comprising an auto-alignment unit provided on the main transfer path, the auto-alignment unit configured to align the banknotes while transferring the banknotes on the main transfer path.

3. The apparatus of claim 1, wherein the verifying unit includes:
   a plural banknotes detection part configured to detect overlapped individual sheets based on a thickness of the banknotes;
   a CIS (Contact Image Sensor) for acquiring and analyzing image information by scanning the banknotes;
   a cash verifying part for verifying authenticity or abnormality of the banknotes by sensing characteristics of the banknotes; and
   an MICR (Magnetic Ink Character Recognition) module for acquiring magnetic ink character information printed on the at least one cheque.

4. The apparatus of claim 3, wherein the verifying unit further includes a plural banknotes detection part configured to detect overlapped banknotes.

5. The apparatus of claim 3, wherein the cash verifying part has one or more detection sensors selected from a light emitting sensor, a magnetic sensor, a UV sensor and an infrared sensor.

6. The apparatus of claim 1, further comprising:
   a memory configured to store various information acquired by the verifying unit;
   a communication controller configured to communicate with a host computer connected therewith;
   a central controller configured to control the memory, the depositing controller, and the communication controller;
   a user input unit configured to receive information from the user;
   a deposit display unit configured to display information to the user; and
   a receipt output unit configured to output a receipt to the user.

7. The apparatus of claim 3, wherein the depositing controller is further configured to determine that an individual sheet in the bundle of banknotes is a cheque responsive to detecting one or more errors at the cash verifying part but detecting no error at the MICR module, and wherein the depositing controller is further configured to determine that an individual sheet in the bundle of banknotes is a banknote other than cheque responsive to detecting one or more errors at the MICR module but detecting no error at the cash verifying part.

8. The apparatus of claim 1, further comprising:
   an authentic cheque incoming unit disposed at a rear end side of the authentic cheque transfer path and configured to temporarily hold an individual sheet of the at least one authentic cheque transferred along the authentic cheque transfer path,
   wherein the authentic cheque storage cassette is configured to store the individual sheet of the at least one authentic cheque responsive to the individual sheet of the at least one authentic cheque being held by the authentic cheque incoming unit.

9. The apparatus of claim 1, further comprising:
   an authentic cash temporary storage provided at a rear end side of the authentic cash transfer path and configured to stack and temporarily hold the authentic banknotes other than cheques transferred along the authentic cash transfer path,
   wherein the authentic cash storage cassette is configured to store a bundle of the stack of authentic banknotes other than cheques held by the authentic cash temporary storage.

* * * * *